United States Patent

[11] 3,623,955

[72] Inventor Leonard Keay
Florissant, Mo.

[21] Appl. No. 752,461
[22] Filed Aug. 14, 1968
[45] Patented Nov. 30, 1971

[73] Assignee Monsanto Company
St. Louis, Mo.

[54] PURIFICATION AND RECOVERY OF ALKALINE PROTEASE USING CATIONIC-EXCHANGE RESIN

6 Claims, No Drawings

[52] U.S. Cl. .......... 195/66 R
[51] Int. Cl. .......... C07g 7/028
[50] Field of Search .......... 195/66

[56] References Cited

UNITED STATES PATENTS 3,482,997 12/1969 Murray et al. .......... 195/62 X

OTHER REFERENCES

Tsuru et al. Agr. Biol. Chem. 30, 651–658 (1966).
Tsuru et al. Agr. Biol. Chem. 30, 1261–1268 (1966).
McConn et al., Journal of Biological Chemistry 239, 3,706–3,715 (1964).

*Primary Examiner*—Lionel M. Shapiro
*Attorneys*—Gordon W. Hueschen, Hueschen and Kurlandsky and John D. Upham

ABSTRACT: Aqueous solution of alkaline protease, for example, a clarified beer from micro-organism production of enzymes or redissolved enzyme mixture, is treated with selected cationic-exchange resins to eliminate undesirable colored materials and any amylase present. Alkaline protease is absorbed, amylase and most pigmented impurities are not.
Use of low ionic strength solutions for absorption and neutral pH solutions, usually also of relatively low ionic strength, for elution, permits elimination of pigmented impurities and maximum protease recovery.

PURIFICATION AND RECOVERY OF ALKALINE PROTEASE USING CATIONIC-EXCHANGE RESIN

BACKGROUND OF THE INVENTION

1. Field of Invention

Enzymes; purification and isolation of alkaline protease.

2. Prior Art

Production of protease and protease-containing enzyme mixtures by *Bacillus subtilis* micro-organisms is known. When such enzyme mixtures contain amylase and colored impurities in addition to protease, separation and purification is difficult. Highly pigmented materials from the fermentation are usually present, and such colored impurities and amylase are difficultly separated from the desired protease. Commercial enzyme mixture products produced and sold according to U.S. Pat. No. 3,031,380 are undesirably highly colored. The prior art, as represented by the cited patent, in the absence of more satisfactory procedure, has employed an aqueous beer filtrate for isolation, with salting out of enzymes by $(NH_4)_2SO_4$ (ammonium sulfate), filtration, discard of the filtrate, redissolution of the filtration residue in water, reconversion to an $(NH_4)_2$SOB4 solution, raising the pH with ammonium hydroxide to precipitate amylase, filtration removal of amylase, and finally addition of further $(NH_4)_2SO_4$ to precipitate protease by downward adjustment of pH and isolation of the same. The individual enzymes then require further purification by dissolution in water, alkamine ion-exchanging to remove some pigment, and alcohol precipitation. It is apparent that this is not a simple procedure and its effectiveness leaves much to be desired, especially since protease and amylase fractions are still cross-contaminated.

A simple method of purification by employment of an ion-exchange resin, whereby colored impurities could be removed from the desired protease, along with other undesired contaminates, such as amylase, and which would be applicable directly to a water-clear fermentation beer or solution of redissolved enzyme solids, would be advantageous.

Okunuki, Hagihara, and Ukita, U.S. Pat. No. 2,952,586, in attempting to solve this problem with relation to protease produced by *Bacillus subtilis* micro-organisms, found that adsorption-elution using Duolite C–10, a highly coarse, porous phenolic polymer having methylene sulfonic acid groups or side chains, also referred to as a sulfonated phenol-formaldehyde resin having omega-sulfonic acid groups, in the $NA^+$ form was a satisfactory way of purifying and isolating protease material produced by various *B. subtilis* micro-organisms. This adsorption-elution process of Okunuki et al. was reported to be inoperative employing other cationic-exchange resins, such as Amberlite IRC–50 and, as stated by Okunuki et al. in column 2 of U.S. Pat. No. 2,952,586, after reporting that Amberlite IRC–50 could not be used for satisfactory purifying *Bacillus subtilis:*

> "Furthermore, it is impossible to purify *Bacillus subtilis* protease by use of any ionic-exchange resins which have been employed in the purification of any other enzyme, under any of the conditions so far reported. In fact, heretofore, there has been no successful and satisfactory purification method of *Bacillus subtilis* protease, not to speak of such method as to be able to be carried out on a large or industrial scale with a good yield or without an appreciable loss of activity."

In their publication appearing at J. Biochem. (Tokyo) 45, 185 (1958), Hagihara, Okunuki et al. further expand on the inoperativeness of Amberlite IRC–50, and state that this resin hardly adsorbed proteinase from solution under any conditions except at very low pH and at low concentration of salts. The authors state that bacterial proteinase was more strongly adsorbed on this resin at a very low salt concentration, e.g., below 0.02 M sodium ion, but that the amount adsorbed was very slight. The authors conclude:

> "Therefore, this resin was not suitable for purification of the enzyme."

It is apparent that an improved and simplified process which does not suffer from the limitation to the single cation-exchange resin of Okunuki et al. but which would be generally applicable to a broad variety of ion-exchange resins, would still be highly desirable.

It is well know that various enzymes have various different activities or capacities. Protease is effective in the digestion of protein material by hydrolysis or bond-splitting activity, neutral protease being active at substantially neutral pHs whereas alkaline protease is active at more alkaline pHs. Because it is highly desirable to have specifically active enzymes available for use in various specific applications, the desirability of having purified protease or mixtures of proteases, as well as efficient methods for the purification and isolation of purified protease or mixed protease products, is readily apparent.

SUMMARY OF THE INVENTION

The present invention involves treatment of a water-clear solution containing enzyme, e.g., protease or mixtures thereof, for example, a beer filtrate or aqueous solution of redissolved enzyme solids, with a cationic-exchange resin selected from the group consisting of carboxymethyl cellulose, phosphonocellulose, carboxymethyl cross-linked dextran, polymethacrylic acid, and polystyrene sulfonic acid, thereby to selectively adsorb the protease with substantial freedom from undesired coloring matter and amylase if present which remain in solution, or on the resin upon elution with the observance of certain critical conditions. The process moreover permits facile removal of color bodies from the protease, adsorption of alkaline protease, and selective elution of the protease by adhering to critical parameters during adsorption and elution, and is a striking and unpredictable advance in the art.

Contrary to the findings of Okunuki et al., we have found that Amberlite IRC–50 and other cationic- ionic-exchange resins are ideally suited for the purification of protease, especially *Bacillus subtilis* protease, quite unexpectedly in view of the statement of the patentees that it is impossible to purify *Bacillus subtilis* protease by the use of any of ionic-exchange resins which have been employed in the purification of any other enzyme under any of the conditions so far reported.

Although it is not known precisely what conditions were employed by Okunuki and coworkers, it is apparent that relatively high ionic strength solutions, at a minimum slightly below 0.02 M sodium ion, were employed for adsorption, and that relatively basic solutions of pH 9–11, also of relatively high ionic strengths, were employed for elution. It is believed that a difference in ionic strength of the solution from which adsorption is effected is critical to the method of the invention, along with the relative neutrality of the solution employed for elution, being responsible jointly for the high degree of operativeness experienced when operating according to the invention as opposed to the negative results reported by Okunuki et al.

Thus, the difference between the present invention and the procedure of the prior art, is that different cationic-exchange resins are employed, that lower ionic strength solutions are employed for adsorption, and that relatively neutral instead of alkaline solutions are employed for elution. In addition generally, but not necessarily always, lower ionic strength solutions are employed according to the present invention for elution, the ionic strengths used in the present invention for elution frequently being of the magnitude of those ionic strengths employed by the prior art for adsorption using a different cationic-exchange resin, as already indicated.

Whereas the prior art equilibrated its cationic-exchange resin with the high ionic strength solution from which adsorption was effected, up to about 0.3 M buffer, usually 0.1 M buffer, according to the present invention substantially lower concentrations are employed for the adsorption, that is, up to about 0.01 M ionic strengths, and usually much lower, and any equilibration of the resin is with water, dilute calcium salt solution, or the lower concentration solutions from which adsorption is to be effected. In addition, the elution is with relatively neutral as opposed to alkaline solutions.

The unpredictability of the effects which will be obtained by changing conditions in the adsorption-elution art, especially relating to enzymes, is already established, and is well stated in the Okunuki et al. U.S. Pat. No. 2,952,586, column 2, lines 19 through 44. According to the present invention, substantially no pigmented impurities are adsorbed by the cationic-exchange resins employed, and such pigmented impurities as are adsorbed are not eluted along with the desired protease so as to cause contamination thereof.

It has now been found that by changing the conditions employed by Okunuki et al. for adsorption, namely, by employing an ionic strength solution of below about 0.01 M concentrations, protease can be readily and selectively adsorbed on selected cationic-exchange resins and that, by eluting under different conditions, namely, by employing relatively neutral pH solutions, e.g., solutions having a pH of about 6–8, preferably about 6.5–7.5, such as an NaCl solution, clean colorless amylase-free protease product is obtained, in fact with no pigmentation or discoloration problem such as encountered by Okunuki et al. using their alkaline buffer eluant. This result can be obtained even when using an eluting solution of the same ionic strength and pH as that employed by Okunuki et al. for the adsorption step.

It has further been found that, following this procedure, alkaline protease along, and in some cases together with neutral protease, can be readily obtained by the adsorption-elution process of the invention, depending upon the composition of the starting solution initially contacted with the resin and the exact product of the elution depending upon conditions employed for the elution.

If alkaline protease is present alone, either a moderate or a high ionic strength solution can be used for the elution.

When both neutral and alkaline protease are adsorbed and it is unnecessary to fractionate them, an eluting solution having either a moderate or a high ionic strength may be used to elute both proteases from the resin at once.

When the terms "moderate ionic strength" and "high ionic strength" are employed, they are respectively intended to describe a solution having a molarity (1) between about 0.05 and 0.2, and (2) greater than 0.2 usually up to about 1.0.

The results of the process of the present invention are entirely unpredictable, namely, that clean colorless protease can be obtained by varying the conditions of adsorption (and preparation of the resin) as to ionic strength of solution and by maintaining the relatively neutral pH conditions during elution, all as previously indicated.

In addition, amylase is removed as a contaminant by the present adsorption-elution procedure, since it is not adsorbed to any substantial extend under the conditions employed according to the invention and since any which is adsorbed can be readily washed out with water or extremely low ionic strength solutions so as not to contaminate subsequent protease fractions.

The distinctions between the process of the present invention and that of Okunuki et al. are apparent from an inspection of the procedures employed and the details of the conditions of adsorption and elution involved. Okunuki et al. prepare their resin using a buffer of 0.3 Normality at a pH of 6–8. To obtain adsorption of protease, the present applicant employs much lower levels of ionic strength, up to about 0.01 molar, usually 0.001 to 0.01 molar, preferably 0.001 to 0.005 molar, for example 0.005 molar, or even plain water.

Okunuki et al. prepare their resin in the same buffer as used for adsorption whereas, preferably after neutralization to a pH of about 7, the present applicant generally washes his resin with water to remove salts, or with 0.1 percent calcium acetate solution for enzyme stabilization (quite in contrast with the much higher ionic strength equilibration of Okunuki et al.).

Then, and most importantly, Okunuki et al., elute with a buffer of 0.5–0.7 Normality, employing a pH of 9–11 for their eluting solution, which comprises 0.1 M ammonium hydroxide, 0.1 M disodium phosphate, and 0.5 M sodium chloride, all employed together.

In contrast, the present applicant elutes with a relatively neutral pH solution, usually a solution of moderate or high ionic strength, i.e., 0.1 to above about 0.2 M, e.g., a 1 M NaCl solution, to remove alkaline protease and any adsorbed neutral protease, but without the pigmentation problem experienced by Okunuki et al. when they elute from a different resin with their stronger buffer solution at a higher pH.

The ionic strength of the solution from which adsorption is effected obviously plays a major role in the unpredictable adsorption phenomena, according to the findings of the present invention, as well as the pH of the solution employed in the unpredictably selective elution of the present invention.

Thus, in summary, it has now been found, unpredictably, that protease selectively adsorbed on a cationic-exchange resin selected from the group consisting of carboxymethyl cellulose, phosphonocellulose, carboxymethyl cross-linked dextran, polymethacrylic acid, and polystyrene sulfonic acid, can be conveniently and selectively eluted therefrom free of pigment and most other undesirable impurities, including amylase, using a substantially neutral eluant, the adsorption being effected using low ionic strengths.

OBJECTS

The provisions of a process having any or all of the above-enumerated advantages is an object of the invention. Additional objects will become apparent hereinafter, and still others will be obvious to one skilled in the art.

GENERAL DESCRIPTION OF THE INVENTION

The starting material for the process of the present invention is a water-clear fermentation beer, as obtained by filtration or centrifugation, or an aqueous extract of the enzyme or enzyme mixture. The latter is obtained by redissolving a crude solid precipitated enzyme or enzyme mixture, as may be obtained by precipitation of the enzyme-containing solids from a clarified fermentation beer using an excess of water-miscible organic solvent in which the enzyme is insoluble, with further clarification if necessary.

The solvent employed for such precipitation is preferably a polar solvent selected from the group consisting of lower-alkanols, e.g., isopropanol, lower-alkyl ketones, e.g., acetone, and cyclic ethers, e.g., tetrahydrofuran and dioxane. Isopropyl alcohol and acetone are preferred solvents. Hereinafter the starting material will sometimes be referred to as the "solution." In either case, the starting material should be a water-clear fluid, which will ordinarily not contain solids visible to the naked eye, hence the designation "water-clear." The invention can also be applied to any other water-clear aqueous solution of protease together with undesirable colored impurities, whether of natural or synthetic origin.

The first essential step in the process of the invention, as already stated, is the selective adsorption of protease, as produced by fermentation culture of a protease-producing strain of *B. subtilis*, employing the selected cation-exchange resin as adsorbent. The protease is adsorbed and subsequently eluted, whereas the colored impurities are unadsorbed or, to the extent adsorbed, uneluted under the conditions of the elution.

According to the invention, if amylase is also present in the starting solution, this is not adsorbed or, to the extent adsorbed, not eluted under the conditions of the elution. The pigment which is adsorbed to a certain extent, even though considerable may be removed earlier in the overall process as by adsorption using DEAE-Cellulose or other anion-exchange agent, is definitely not eluted under the conditions of the elution. If amylase is removed at an earlier stage of the total process, then it does not enter into the adsorption-elution step at all.

The cationic-exchange resins employed according to the invention are readily available commercially. They may be used according to the invention in a batch, continuous, or column process, or in similar manner, according to the established art of adsorption-elution and chromatography. The resin, e.g., column, may advantageously be adjusted to a neutral pH, e.g., washed with water or dilute calcium acetate solution, e.g., 0.1 percent aqueous solution or with a very dilute buffer, e.g., the adsorbing solution, prior to adsorption therewith.

The protease is adsorbed onto the resin by bringing it into contact therewith, in the form of an aqueous solution thereof. The conditions of the adsorption are that the adsorbing solution should have a low ionic strength, between 0 and 0.01 molarity, to enable adsorption of all of the protease on the resin. The pH should preferably be between about 6 and 8, and advantageously about 6–7.5. The pH of the starting enzyme-containing solution will usually be between about 5.5 and 7, preferably 6 to 6.5, and thus the desired starting pH range is readily obtainable if not a normal pH range for the starting enzyme-containing solution.

The solution may be stabalized by the addition of calcium acetate or other suitable soluble calcium salt, for example, the gluconate, the chloride, or the like. Preferably the stabilizing amount of calcium salt is up to about 0.2 percent, and the preferred form is an about 0.1 percent calcium acetate aqueous solution. Such solutions are readily obtained by redissolving the solid obtained by solvent precipitation of the enzyme or enzyme mixture, and filtering or centrifuging the resulting solution, or by directly filtering or centrifuging the fermentation beer, and adding the necessary buffer or salt to the concentration desired.

The adsorption is preferably conducted employing a solution containing up to about 2.5 percent of dissolved solids, preferably about 1 percent of dissolved solids, or an enzyme level not greater than about 50,000 enzyme units per milliliter as determined by the Anson variation of the well-known Kunitz casein digestion method.

If it is desired to wash the adsorbent, after protease has been adsorbed thereon, for further removal of undesired impurities, whether in column form or otherwise, water, aqueous organic solvent, e.g., acetone, solutions, or a dilute solution of a soluble calcium salt, for example an about 0.02 percent solution of a calcium salt, preferably calcium acetate, may advantageously be employed. Such solutions as are employed for washing of the column containing the adsorbed protease should be at or about a neural pH and of low ionic strength such that protease is not eluted. Elution of the protease from the column may then be effected employing a solution of somewhat greater ionic strength, also at or about neutral pH, further disclosed in detail hereinafter.

The second essential step in the process involves elution of the adsorbed protease. This is effected by means of an eluting solution comprising an aqueous buffer, at an ionic strength greater than about 0.05 M but below the point where crystallization of the buffer occurs. Advantageously, aqueous buffer of ionic strength greater than 0.2 M is employed. Usually a solution of up to about 1.0 M is employed when no fractionation of protease is involved. This may follow washing with water in case amylase is present, if it is desired to eliminate any amylase prior to the protease elution. In any event, however, the elution is with a relatively neutral pH solution, one having a pH of about 6–8, and preferably about 6.5–7.5, to avoid contamination with highly colored impurities. The elution pH may frequently advantageously be slightly higher than that employed during adsorption.

Precipitation of the protease from the eluted fractions may be effected using solid ammonium sulfate or other suitable precipitant, e.g., sodium sulfate or, if the elution was made with phosphate buffer, the eluted protease solution may be further treated with a calcium salt, for example, calcium acetate, in an amount up to about 2 percent by weight, in such case with adjustment of pH slightly upwardly to about 7.5 to produce a precipitate of calcium phosphate, which may then be removed by physical means such as filtration or centrifugation. Dialysis of the protease-containing supernatant, recentrifugation or filtration, and lyophilization further increases the purity of the protease or proteases, as will be apparent.

Although cooling to any temperature below room temperature has been found advantageous, it is desirable that, for best results, both the eluting solution and the starting enzyme-containing solution be chilled to 10° C. or below, and about 5° C. has been found an extremely useful, attainable, and operative temperature for carrying out the method of the invention. If the eluting and adsorbing solutions are not cooled, as previously described, less satisfactory purifications, separations, and yields of desired protease fractions are obtained.

When operating in the foregoing manner, recoveries of colorless protease are usually between 50 and 60 percent of the protease adsorbed by the resin, and frequently as high as 70 percent or even greater percentages of the protease originally adsorbed on the resin. The process of the invention also allows a clear, efficient fractionation of neutral from alkaline protease in a simple and convenient manner, if desired, and gives a colorless protease product which is additionally purified of other impurities and pigments which are not adsorbed, or not eluted, the final purity and composition of the protease product depending upon the additional steps employed at an earlier stage in the overall process, as already stated.

Thus, at least the alkaline protease produced by a protease-producing strain of *Bacillus subtilis*, for example *B. subtilis* strain AM, can be isolated essentially free of amylase and pigment free, from a starting source of clarified fermentation beer or redissolved crude solids precipitated from a fermentation beer by solvent addition, as a result of the critical conditions employed during adsorption of the protease and subsequent elution from the resin.

Starting enzyme-containing beers can be obtained from micro-organism fermentation, e.g., production of enzymes by bacteria, using well-known fermentation methods such as those generally described in Kirk-Othmer, Encyclopedia of Chemical Technology 8, 173–204.

The exact activity of the enzymes employed as starting material depends on the method of preparation and is not critical to the present invention providing only that the starting solution has the desired protease activity. Various analytical methods are available to determine the activity of enzymatically active material, for example, the protease activity of proteolytic enzymes can be determined by well-known casein digestion methods. According to such tests, a protease catalyzes the hydrolysis of casein for a certain period of time and temperature and at a certain pH, the reaction is stopped by the addition of trichloroacetic acid, and the solution is filtered. The color of the filtrate is developed by Folin phenol reagent, and the level of enzyme activity is measured spectrophotometrically in units of casein tyrosine. This method is more fully described in the Journal of General Physiology 30, 291 (1947) and in Methods of Enzymology 2, 33 by Academic Press N.Y. (1955). Amylase activity is generally determined by the well-known dinitrosalicylic acid method of Bernfeld.

A particularly effective source of mixed enzymes which can be used as starting material in the present invention is a mutated *Bacillus subtilis* organism. The process for producing this organism and enzymes therefrom is described in U.S. Pat. No. 3,031,380. A culture of this *Bacillus subtilis* (strain AM) organism has been deposited with the United States Department of Agriculture, Agricultural Research Service, Northern Utilization Research and Development Division, 1815 North University Street, Peoria, Ill., 61604, and has been assigned No. NRRL B-3411. The enzymatically active material produced by this organism has been found generally to consist of two proteases, approximately 65–75 percent neutral protease (activity at a pH of 7.0–7.5) and about 25–35 percent alkaline protease (activity at a pH of 9–10). A significant amount of amylase is also present. There are generally about 700,000 to about 1.2 million units of neutral protease activity per gram and about 250,000 to about 400,000 units of alkaline protease activity per gram of precipitated solids as determined by Anson's variation of the Kunitz "casein" method. There are generally about 300,000 to 350,000 units of amylase activity per gram as determined by the Bernfeld method. As pointed out in the cited patent, the relative proportions of protease to amylase will vary depending on the exact conditions of growth of the micro-organism, but we have found that the neutral and alkaline protease and the amylase will be produced, in at least some amounts, almost regardless of changes in the culture medium and other conditions of growth of the micro-organism.

Another source of enzymes which can be used as starting material in accord with the present invention is *B. subtilis* strain NRRL 644, *B. subtilis* strain NRRL 941, and *B subtilis* strain IAM 1523 (Japanese Culture Collection). Still other *B. subtilis* and additional micro-organisms are available which produce protease or a mixture of proteases or protease and amylase, at least to a limited if not optimum extent.

DESCRIPTION OF THE PREFERRED EMBODIMENTS

The following examples are given by way of illustration only, and are not to be construed as limiting.

General Outline of Preparation of Fermentation Beer

A culture of *Bacillus subtilis* AM is inoculated into a sterile slurry of grains and other nutrient material (such as rice bran, corn meal, fish mean, wheat bran, Enzose (TM—about 50–80 percent dextrose and the balance higher saccharides, being the dried mother liquor remaining from dextrose manufacture by enzymatic hydrolysis of corn starch), distillers solubles, corn steep liquor, etc.) containing protein, carbohydrate, minerals, and growth factors. The vessel is agitated and aerated by bubbling sterile air through the inoculated slurry. The Ph may be controlled or left to achieve its own natural pH. Aliquots of the beer are removed for assay at various times and, when enzyme production is apparently a maximum, the fermentation beer is then centrifuged and/or filtered prior to enzyme isolation.

Some details and examples of this type of enzyme production method are given generally in U.S Pat. Nos. 2,530,210 of C. V. Smythe, B. B. Drake and C. E. Neubeck (to Rohm & Haas Company, Nov. 14, 1950), and 2,549,465 of J. C. Hoogerheide and E. G. Laughery (to Pabst Brewing Company, Apr. 17, 1951) and particularly in U.S. Pat. No. 3,031,380 of Apr. 24, 1962.

The foregoing procedure, especially that of U.S. Pat. No. 3,031,380, is productive of a fermentation beer containing the desired enzyme mixture. For clarification purposes to give a water-clear beer for use as starting material, this fermentation beer may merely be centrifuged and/or filtered. Alternatively, the solid enzyme mixture may be precipitated by adding an excess of solvent, e.g., isopropanol or acetone, to the fermentation beer either without prior filtration or centrifugation or after a prior centrifugation and/or filtration, which is productive of a solid precipitate comprising an enzyme mixture, which may then be readily redissolved in water to give a water-clear enzyme solution which may be used as starting material in the process of the invention. Obviously, the starting solution, by whichever procedure procured, may be subjected to addition centrifugation and/or filtration if desired to upgrade the quality of the starting enzyme solution.

EXAMPLE 1

Isolation of *B. subtilis* AM Alkaline Protease by Chromatography on Carboxymethyl Cellulose One hundred grams enzyme mixture (neutral protease, alkaline protease and amylase) was stirred with 1 liter of 0.001 M tris/maleate [tris(hydroxymethyl)aminomethane maleate]0.005 M calcium acetate pH 6.4 (referred to as starting buffer) at 4° C. for 1 hour, then centrifuged to remove insolubles. The pH of the supernatant was adjusted to 7.5 with sodium hydroxide and ammonium sulfate added with stirring at 4° C. to give 0.3 saturation. The precipitate was removed by centrifugation and discarded. Ammonium sulfate was added to the supernatant to give 0.6 saturation and the precipitate collected by centrifugation, dissolved in starting buffer, and dialyzed against starting buffer for 36 hours at 5° with 2 changes of buffer.

The dialyzed solution was applied to a 5×60 cm. column of carboxymethyl cellulose equilibrated with the starting buffer. The column was washed with starting buffer and alkaline protease then eluted with starting buffer made 0.05 M with NaCl. The recovery of alkaline protease was about 20 percent of the total proteases in the original mixture or about 70–80 percent of the alkaline protease originally present.

EXAMPLE 2

Isolation of *B. subtilis* AM Protease by Chromatography on Carboxymethyl Cellulose One hundred grams crude enzyme mixture was stirred at 4° C. for 1 hour with 1 liter 0.001 M tris/maleate 0.002 M calcium acetate pH 6.4 (the starting buffer) and the insolubles then removed by filtration. One hundred and twenty grams DEAE-Cellulose (previously adjusted to pH 6.4 with acetic acid and washed with starting buffer) was added and the mixture stirred at 5° for 30 minutes and then filtered. The resin was washed with a little starting buffer and the filtrate and washings were combined and adjusted to pH 7.4. Ammonium sulfate was added at 4° to the filtrate and washings with stirring to give 0.6 saturation. The precipitate was collected and resuspended in 200 ml. starting buffer and dialyzed for 36 hours at 4° against starting buffer.

The dialyzed enzyme was applied to a 5×60 cm. column of carboxymethyl cellulose (previously equilibrated with the starting buffer). The column was then washed with 500 ml. of starting buffer, then with 2 liters of starting buffer made 0.01 M with NaCl. The pigment-free and amylase-free protease was then eluted with starting buffer made 0.033 M with NaCl. The recovery of protease was 14 percent of the total protease present or some 50 percent of the alkaline protease present and had a specific activity of $6.8\times10^6$ units/g.

EXAMPLE 3

Isolation of *B. subtilis* AM Alkaline Protease by Chromatography on Carboxymethyl Cellulose Fifty grams crude enzyme mixture was stirred with 1 liter 0.001 M tris/maleate 0.005 M calcium acetate pH 6.4 (starting buffer) for 30 minutes. The pH was adjusted to 7.5 with N/1 NaOH. Two hundred grams Ammonium sulfate was added with stirring at 4° C. and, after 30 minutes, the precipitate was collected by centrifugation and discarded. To the 950 ml. supernatant was added a further 200 g. ammonium sulfate and the precipitate collected, redissolved in 200 ml. starting buffer, and dialyzed against 12 liters starting buffer at 5° for 36 hours with two changes of buffer.

After centrifuging to remove sediment, the solution was applied to a 5×60 cm. column of carboxymethyl cellulose previously equilibrated with starting buffer and the column was washed with starting buffer. The protease was then eluted with starting buffer made 0.05 M with NaCl. The enzyme was concentrated by adding 2½ volumes cold acetone, collecting the precipitate by centrifugation, redissolving in water and lyophilizing. Weight of amylase-free and pigment-free protease was 288 g., specific activity $3.30\times10^6$ protease units at pH 7.0, $3.51\times10^6$ protease units at pH 10.0.

EXAMPLE 4

Isolation of *B. subtilis* (NRRL 941) Protease by Chromatography on Carboxymethyl Cellulose Ten grams crude enzyme mixture was stirred at 5° C. with 100 ml. 0.001 M tris/maleate 0.002 M calcium acetate pH 6.4 for 30 minutes and centrifuged to give a clear supernatant.

The pH was adjusted to 6.5 and 20 ml. of the supernatant was applied to a 1.3×50 cm. column of carboxymethyl cellulose equilibrated with the starting buffer. The column was washed with starting buffer and the protease then eluted with 0.1 M NaC1. The recovery of protease was 25 percent but very low in amylase and pigment free.

EXAMPLE 5

Isolation of *B. subtilis* AM protease by Chromatography on Carboxymethyl Cellulose Ten grams enzyme mixture was stirred at 4° C. in 200 ml. 0.002 M tris/maleate 0.005 M calcium acetate pH 6.4 (starting buffer) and clarified by centrifugation. Ten grams DEAE-Cellulose (previously adjusted to pH 6.4 with acetic acid) was added, the mixture stirred at 4° for 20 minutes, and the resin then removed by filtration. Twenty milliliters, 0.2 M calcium acetate, 10 ml. 0.1 M phosphate pH 7.8, 125 ml. ethanol and 20 g. pulverized wheat starch were then added with stirring at 5° and, after 15 minutes stirring, the precipitate was collected by centrifugation. The addition of starch and filtration (after stirring) were repeated twice more. To the final filtrate was added 650 ml. acetone and the precipitate collected and redissolved in starting buffer to yield 65 ml. solution.

A portion of the solution was applied to a 1.2×50 cm. column of carboxymethyl cellulose equilibrated in the starting buffer. The column was washed with starting buffer and the protease then eluted with starting buffer made 0.1 M with NaC1. The recovery of pigment-free amylase-free protease in the eluate was 18 percent.

EXAMPLE 6

Isolation of *B. subtilis* AM Alkaline Protease by Chromatography on Carboxymethyl (CM) Cellulose Thirty millimeters of an aqueous solution of partly purified enzyme mixture was applied to a 3×30 cm. column of carboxymethyl cellulose adjusted to pH 6.4 in 0.002 M Na acetate and 0.4 percent calcium acetate. The column was washed with the same solution and then the protease was eluted with the same solution plus 0.1 M NaC1. The recovery of amylase-free pigment-free protease in the eluate was 25 percent of the total protease present or about 70–80 percent of the alkaline protease applied to the column.

EXAMPLE 7

Isolation of *B. subtilis* AM Alkaline Protease by Chromatography on CM-Cellulose Fifty grams crude enzyme mixture was stirred with 1 liter 0.001 M tris/maleate, 0.002 M calcium acetate pH 6.4 (starting buffer) for 1 hour at 5° C., then 120 g. DEAE-Cellulose (previously equilibrated to pH 6.4 in the same buffer) was added to remove pigment and the mixture stirred at 5° for 30 minutes and the resin removed by vacuum filtration, washed with 300 ml. starting buffer and the filtrate and washings combined (volume 2,500 ml.). The pH was adjusted to 7.8 and 1,000 g. ammonium sulfate added with stirring and then allowed to settle for 2 hours at 5°. The precipitate was collected by centrifugation, redissolved in about 150 ml. starting buffer and dialyzed against 16 liters of starting buffer at 5° for 36 hours with two changes of dialysis medium.

The dialyzed enzyme was recentrifuged and applied to a 3×60 cm. column of CM-Cellulose equilibrated with the starting buffer. The column was washed with the starting buffer and then eluted with 0.01 M NaC1 followed by 0.033 M NaC1 in the starting buffer. The unadsorbed material contained the pigment, amylase and neutral protease while the eluted material was the alkaline protease. The recovery of alkaline protease was about 10 percent of the mixed neutral and alkaline proteases applied to the top of the column or about 40–50 percent of the alkaline protease present.

EXAMPLE 8

Isolation of *B. subtilis* AM Alkaline Protease by CM-Cellulose Chromatography

Eight grams crude enzyme mixture was stirred in 120 ml. 0.002 M tris/maleate 0.005 M calcium acetate pH 6.4 (starting buffer) at 5° C. for 20 minutes, then centrifuged to yield 112 ml. of starting extract. Ten grams DEAE-Cellulose (adjusted to pH 6.4 in the starting buffer) was added and, after stirring for 20 minutes at 5° C., removed by filtration. Three hundred milliliters cold (5°) acetone was added to the filtrate and the precipitate collected by centrifugation.

The precipitate was dissolved in 50 milliliters starting buffer, clarified by centrifugation and applied to a 2.5×40 cm. column of carboxymethylcellulose equilibrated with the starting buffer. The column was washed with starting buffer and the protease eluted with 0.1 M NaC1 in the starting buffer. The yield of pigment-free, amylase-free protease was about 8 percent of the protease in the starting enzyme mixture or about 30–35 percent of the alkaline protease present in the starting enzyme mixture.

EXAMPLE 9

Isolation of *B. subtilis* AM Alkaline Protease by Chromatography on Amberlite CG–120 (TM-polystyrene Sulfonic Acid Cationic-Exchange Resin—Rohm and Haas)

Fifty milligrams crude enzyme mixture was dissolved in 10 ml. water and applied to a 2.0×10.0 column of Amberlite CG–120 (TM) adjusted to pH 6.5 in distilled water. The column was washed with 100 ml. of distilled water, and the protease eluted with 1 M NaCl. The recovery of pigment-free and amylase-free alkaline protease was 82 percent.

EXAMPLE 10

Isolation of *B. subtilis* AM Alkaline Protease by Chromatography on Phosphonocellulose (TM-Cellex-P; Bio Rad)

Ten grams crude enzyme mixture was stirred at 4° C. for 30 minutes with 200 ml. 0.002 tris/maleate 0.005 M calcium acetate pH 6.4 (starting buffer) and then centrifuged to yield 180 ml. extract. Ten grams DEAE-Cellulose (adjusted to pH 6.4 with acetic acid) was added and the mixture stirred for 20 minutes at 4°, then filtered and the precipitate washed with a little starting buffer. Twenty milliliters 0.2 M calcium acetate, 10 ml. 0.1 M phosphate pH 7.8 and 125 ml. ethanol were added, followed by 20 g. pulverized wheat starch. The mixture was stirred for 15 minutes at 4° and the precipitate removed by centrifugation. The starch treatment was repeated twice more to yield 310 ml. filtrate. Acetone (650 ml.) was added to the filtrate with rapid stirring. The precipitate was collected by centrifugation and dissolved in starting buffer, the final volume being 65 ml. acetone precipitated extract.

Acetone extract was applied to a 1.2×30 ml. column of Cellex-P (TM) in the starting buffer at pH 6.4. The column was washed with starting buffer and the protease eluted with 0.1 M NaC1 in the same buffer. The recovery of pigment-free protease was 23 percent of the total protease or about 80 percent of the alkaline protease applied to the column.

EXAMPLE 11

Isolation of *B. subtilis AM Protease by Chromatography on Amberlite IRC*–50 (TM-polymethacrylic Carboxylic Acid Cationic-Exchange Resin—Rohm and Haas)

Five grams crude enzyme mixture was stirred with 125 ml. 0.001 M tris/maleate 0.005 M calcium acetate pH 6.4 (starting buffer) and then centrifuged to give a clear starting extract.

Ten milliliters of starting extract was applied to a 0.8×20 cm. of Amberlite IRC–50 (TM) ion-exchange resin previously suspended in the starting buffer and adjusted to pH 6.5. The column was washed with starting buffer and the colorless amylase-free protease eluted with the starting buffer made 0.1 M with respect to NaC1. The recovery of protease was almost quantitative.

EXAMPLE 12

Isolation of *B. subtilis* AM Alkaline Protease by Chromatography on CM-Sephadex C–25 (TM-carboxymethyl Cross-linked Dextran-Pharmacia)

Nine liters of fermentation beer was clarified by centrifugation and treated with DEAE-Cellulose (200 g., adjusted to pH 6.4) at 5° C. for 30 minutes. The resin was removed by filtration and the DEAE-Cellulose treatment repeated. Eighty grams calcium acetate was added, the pH adjusted to pH 7.5, and 2,240 g. ammonium sulfate added with stirring. The precipitate was removed by centrifugation and a further 900 g. ammonium sulfate added to the supernatant. The second ammonium sulfate precipitate was collected, redissolved in 1 liter 0.1 percent calcium acetate, and 100 g. starch and 120 ml. ethanol added and stirred for 20 minutes at 5°. The suspension was filtered and 2 liters of cold acetone added with stirring. The precipitate was collected, redissolved in 0.1 percent acetate, and lyophilized. Lyophilized enzyme (200 mg.) was dissolved in 8 ml. of water and the pH adjusted to 6.4.

The solution was applied to a 1.2×30 cm. column of CM-Sephadex C–25 (adjusted to pH 6.4 and equilibrated in 0.1 percent calcium acetate). The column was washed with 0.1 percent calcium acetate solution and the colorless protease then eluted with 0.12 M NaC1, dialyzed and lyophilized. The recovery of alkaline protease was about 35 percent of that applied to the column.

EXAMPLE 13

A clarified fermentation beer from the fermentation of *B. subtilis* var. amylosacchariticus, a known producer of alkaline protease, is treated in a manner of example 1. Similar results are obtained.

The same results are obtained using water-clear fermentation beers from the other *B. subtilis* strains previously mentioned.

EXAMPLE 14

A synthetic mixture comprising a water-clear solution of amylase and alkaline protease is prepared and adjusted to a pH of approximately 6.5. The product is treated in accord with the procedure of example 6. Fractionation into its components of amylase and alkaline protease is readily effected.

It is to be understood that the invention is not to be limited to the exact details of operation or exact compounds, compositions, or procedures shown and described, as obvious modifications and equivalents will be apparent to one skilled in the art, and the invention is therefore to be limited only by the full scope of the appended claims, including the application of the doctrine of equivalents thereto.

I claim:

1. An ion-exchange resin adsorption-elution process for the isolation of substantially colorless alkaline protease from a water-clear aqueous solution thereof, such as obtained by dialysis of a clarified fermentation beer or a clarified aqueous solution of redissolved solids precipitated from a fermentation beer, said solution containing protease together with most of the amylase and colored impurities originally present in said water-clear aqueous solution, which comprise the step of selectively adsorbing the protease from said water-clear aqueous solution on a cationic-exchange resin selected from the group consisting of carboxymethylcellulose, phosphonocellulose, carboxymethyl cross-linked dextran, polymethacrylic acid, and polystyrene sulfonic acid, and selectively eluting it therefrom, the step of adsorption of the alkaline protease being effected at a pH between about 6 and 8 directly from said water-clear aqueous solution thereof having a concentration up to about 0.01 molarity and the step of selectively eluting the alkaline protease from the resin being effected using an eluant solution having a relatively neutral pH between about 6 and about 8 and a relatively high ionic strength greater than about 0.2 molarity, amylase and most colored impurities not being adsorbed and colored impurities which are adsorbed being left behind in the elution process, wherein the starting solution is a clarified fermentation beer from the fermentation production of enzyme by a protease-producing strain of a Bacillus species or a clarified aqueous solution of previously precipitated and redissolved solids from such Bacillus species fermentation beer.

2. Process of claim 1, wherein the eluting solution has a pH between about 6.5 and 7.5.

3. Process of claim 1, further characterized in that the protease is adsorbed on the resin from a solution thereof having a low ionic strength between about 0.001 and about 0.01 molarity.

4. Process of claim 1, further characterized in that the protease is adsorbed on the resin from a solution thereof having a low ionic strength between about 0.001 and about 0.005 molarity.

5. Process of claim 3, wherein the adsorption is effected at a relatively neutral pH between about 6 and 7.5.

6. Process of claim 1, wherein the starting solution is a clarified fermentation beer from the fermentation production of enzyme by a protease-producing strain of *Bacillus subtilis* or a clarified aqueous solution of previously precipitated and redissolved solids from such *Bacillus subtilis* strain fermentation beer.

* * * * *

Monsanto #E-35

UNITED STATES PATENT OFFICE

CERTIFICATE OF CORRECTION

Patent No. 3,623,955 Dated November 30, 1971

Inventor(s) Leonard Keay

It is certified that error appears in the above-identified patent and that said Letters Patent are hereby corrected as shown below:

| | |
|---|---|
| Abstract, line 5 | "absorbed"<br>-- adsorbed -- |
| Abstract, line 7 | "absorption"<br>-- adsorption -- |
| col. 1, line 23<br>page 1, line 18 | "$(NH_4)_2$SOB4"<br>-- $(NH_4)_2SO_4$ -- |
| col. 1, line 46<br>page 2, line 7 | "NA+"<br>-- Na+ -- |
| col. 1, line 53<br>page 2, line 14 | "satisfactory"<br>-- satisfactorily -- |
| col. 3, lines 16 & 17<br>page 5, line 25 | "concentrations,"<br>-- concentration, -- |
| col. 3, line 30<br>page 6, line 5 | "along,"<br>-- alone, -- |
| col. 3, line 45<br>page 6, line 21 | "(2) greater than 0.2 usually"<br>-- (2) greater than 0.2, usually -- |
| Col. 3, line 55<br>page 6, line 30 | "extend"<br>-- extent -- |
| col. 4, line 30<br>page 8, line 11 | "provisions"<br>-- provision -- |
| col. 5, line 21<br>page 10, line 10 | "stabalized"<br>-- stabilized -- |

FORM PO-1050 (10-69)

USCOMM-DC 60376-P69
U.S. GOVERNMENT PRINTING OFFICE : 1969 O—366-334

Monsanto #E-35

UNITED STATES PATENT OFFICE

CERTIFICATE OF CORRECTION

Patent No. 3,623,955 Dated November 30, 1971

Inventor(s) Leonard Keay

It is certified that error appears in the above-identified patent and that said Letters Patent are hereby corrected as shown below:

| | |
|---|---|
| col. 5, line 47<br>page 11, line 3 | "neural"<br>-- neutral -- |
| col. 5, line 51<br>page 11, line 6 | "pH, further"<br>-- pH, as further -- |
| col. 6, line 30<br>page 12, line 28 | "pigment free"<br>-- pigment-free -- |
| col. 7, line 29<br>page 14, line 32 | "fish mean"<br>-- fish meal -- |
| col. 10, line 37<br>page 20, line 32 | "0.002 tris/maleate"<br>-- 0.002M tris/maleate -- |
| col. 11, line 19<br>page 22, line 11 | "acetate"<br>-- calcium acetate -- |
| Claim 1, line 10<br>see Claim 1(Twice amended) line 8 in Response and Amendment after Final Rejection dated April 29, 1971 | "comprise"<br>-- comprises -- |

Signed and sealed this 6th day of June 1972.

(SEAL)
Attest:

EDWARD M.FLETCHER,JR.
Attesting Officer

ROBERT GOTTSCHALK
Commissioner of Patents

RM PO-1050 (10-69)

USCOMM-DC 60376-P69
★ U.S. GOVERNMENT PRINTING OFFICE : 1969 O—366-334